United States Patent
Chang (10) Patent No.: US 12,461,882 B2
(45) Date of Patent: Nov. 4, 2025

(54) METHOD AND CIRCUIT FOR MULTIPLEXING USB INTERFACE, ELECTRONIC DEVICE AND STORAGE MEDIUM

(71) Applicant: ZTE CORPORATION, Shenzhen (CN)

(72) Inventor: Zhe Chang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 136 days.

(21) Appl. No.: 18/272,359

(22) PCT Filed: Feb. 28, 2022

(86) PCT No.: PCT/CN2022/078510
§ 371 (c)(1),
(2) Date: Jul. 14, 2023

(87) PCT Pub. No.: WO2022/188658
PCT Pub. Date: Sep. 15, 2022

(65) Prior Publication Data
US 2024/0078208 A1 Mar. 7, 2024

(30) Foreign Application Priority Data
Mar. 9, 2021 (CN) .......................... 202110258065.6

(51) Int. Cl.
*G06F 13/40* (2006.01)
*G06F 13/42* (2006.01)

(52) U.S. Cl.
CPC .. *G06F 13/4282* (2013.01); *G06F 2213/0042* (2013.01)

(58) Field of Classification Search
None
See application file for complete search history.

(56) References Cited

U.S. PATENT DOCUMENTS

| 7,748,992 | B1 | 7/2010 | Wooley et al. |
| 10,007,621 | B2 * | 6/2018 | Ding .................. G06F 13/4295 |

(Continued)

FOREIGN PATENT DOCUMENTS

| CN | 201927859 U | 8/2011 |
| CN | 105677602 A | 6/2016 |

(Continued)

OTHER PUBLICATIONS (ISA/237) Written Opinion of the International Searching Authority dated May 26, 2022.

(Continued)

*Primary Examiner* — Michael Sun
(74) *Attorney, Agent, or Firm* — NZ Carr Law Office (57) ABSTRACT

The embodiments of the present disclosure relate to the technical field of communications, and provide a method and circuit for multiplexing a USB interface, an electronic device and a storage medium. The method includes: acquiring at least one path of level signal, other than a service data signal and a ground signal, in a USB interface; according to a logic result of the at least one path of level signal and a predefined correlation, determining a target port of a target processor corresponding to the logic result as a transmission object of the USB interface, wherein the correlation comprises a logic result of the at least one path of level signal uniquely corresponding to each port of each processor; and transmitting received data to the transmission object by means of the USB interface, and sending data to be sent of the transmission object by means of the USB interface.

20 Claims, 5 Drawing Sheets

At least one path of level signal other than a service data signal and a ground signal in the USB interface is acquired According to a logic result of the at least one path of level signal and a predefined correlation, a target port of a target processor corresponding to the logic result is determined as a transmission object of the USB interface, wherein the correlation includes a logic result of the at least one path of level signal uniquely corresponding to each port of each processor Received data is transmitted to the transmission object by means of the USB interface, and data to be sent of the transmission object is sent by means of the USB interface (56) References Cited

U.S. PATENT DOCUMENTS

| | | |
|---|---|---|
| 10,855,470 B2 | 12/2020 | Soffer |
| 11,921,663 B2* | 3/2024 | Hu .......................... G06F 13/38 |
| 2007/0005840 A1* | 1/2007 | Cheng ................... G06F 1/1632 |
| | | 710/62 |
| 2008/0005262 A1* | 1/2008 | Wurzburg ........... G06F 13/4022 |
| | | 709/217 |
| 2012/0231835 A1* | 9/2012 | Zhang ................... H04W 88/06 |
| | | 455/552.1 |
| 2012/0263101 A1 | 10/2012 | Jibbe et al. |
| 2016/0170914 A1* | 6/2016 | Pethe ................. G06F 13/4022 |
| | | 710/20 |
| 2016/0335221 A1* | 11/2016 | Zhu ........................ G06F 13/36 |
| 2017/0139467 A1* | 5/2017 | Waters .................. G06F 13/385 |

FOREIGN PATENT DOCUMENTS

| | | |
|---|---|---|
| CN | 205725735 U | 11/2016 |
| CN | 111597131 A | 8/2020 |
| EP | 2682872 A9 | 6/2014 |

OTHER PUBLICATIONS

International search report of the corresponding PCT Application No. PCT/CN2022/078510 mailed on May 26, 2022 along with English translation thereof.
EESR of the corresponding EP Patent Application No. 22766184.0 dated Apr. 4, 2024.
Anonymous: "Multiplexer—Wikipedia", Jan. 12, 2021 (Jan. 12, 2021), pp. 1-7, XP093144628, Retrieved from the Internet: URL:https://en.wikipedia.org/w/index.php?title=Multiplexer&oldid=999989492 [retrieved on Mar. 22, 2024] * the whole document*.

* cited by examiner

METHOD AND CIRCUIT FOR MULTIPLEXING USB INTERFACE, ELECTRONIC DEVICE AND STORAGE MEDIUM

CROSS REFERENCE TO RELATED APPLICATIONS

This application is based upon and claims priority to Chinese Patent Application No. 202110258065.6, filed on Mar. 9, 2021, the entire contents of which are incorporated herein by reference.

TECHNICAL FIELD

Embodiments of this application relate to the field of communications, in particular to a method and circuit for multiplexing a USB interface, an electronic device and a storage medium.

BACKGROUND

With the development of wireless terminal products, the products are becoming more and more integrated and have more and more functions. Especially for the data terminal products, in order to improve the performance and competitiveness of the products, single-core processors in terminals have gradually been updated to multi-core processors, for example, from a modem to a Microcontroller Unit (MCU)+modem, an Access Point (AP)+modem, etc. Each processor in a multiprocessor has its own function, and each processor has its own interface for debugging and data communication, such as a Universal Serial Bus (USB) interface, a Universal Asynchronous Receiver/Transmitter (UART) interface and a Serial Peripheral Interface (SPI).

However, there may be a plurality of processors in the terminal and each processor has its own processor interface for debugging and data communication, or, there may be one processor in the terminal and the processor includes at least two processor interfaces. Therefore, the terminal needs to be provided with a plurality of interfaces for peripheral access that respectively transmit data for debugging and communication to corresponding processor ports, thereby realizing debugging and data communication for the processor. Taking a dual-processor product as an example, each processor has one port for debugging and communication, for example, a UART interface+USB interface. In this case, the terminal product needs to be designed with at least 4 interfaces for peripheral access to transmit data for debugging and communication to the processor ports. Forms of the interfaces for peripheral access include standard USB interfaces, debugging connectors, test points, etc., which is complex. In particular, for some products, it is required to design the debugger separately, and destructive operations such as disassembling the device are needed in subsequent debugging or fault handling. Therefore, for these products, it is required to design dual USB interfaces for peripheral access, or some functions have to be abandoned if only one USB interface is designed for peripheral access.

SUMMARY

An embodiment of this application provides a method for multiplexing a USB interface, an electronic device to which the USB interface belongs includes a plurality of ports of one processor, or includes a plurality of processors, and each processor includes at least one port. The method includes: acquiring at least one path of level signal other than a service data signal and a ground signal in the USB interface; determining, according to a logic result of the at least one path of level signal and a predefined correlation, a target port of a target processor corresponding to the logic result as a transmission object of the USB interface, wherein the correlation comprises a logic result of the at least one path of level signal uniquely corresponding to each port of each processor; and transmitting received data to the transmission object by means of the USB interface, and sending data to be sent of the transmission object by means of the USB interface.

An embodiment of this application further provides a circuit for multiplexing a USB interface, including: a USB interface, configured to transmit signals; a decoder, configured to acquire at least one path of level signal other than a service data signal and a ground signal in the USB interface, and determine, according to a logic result of the at least one path of level signal and a predefined correlation, a target port of a target processor corresponding to the logic result as a transmission object of the USB interface; wherein, the correlation includes a logic result of the at least one path of level signal uniquely corresponding to each port of each processor; and a multiway switch, configured to gate a transmission channel between the USB interface and the transmission object, such that received data is transmitted to the transmission object by means of the USB interface and data to be sent of the transmission object is sent by means of the USB interface.

An embodiment of this application further provides an electronic device, the device including the circuit for multiplexing a USB interface as described above.

An embodiment of this application further provides a computer-readable storage medium storing a computer program, and the computer program, when executed by a processor, implements the method for multiplexing a USB interface as described above.

BRIEF DESCRIPTION OF THE DRAWINGS

One or more embodiments are described exemplarily by pictures in the corresponding drawings, and these exemplary descriptions do not constitute the limitations to the embodiments.

One or more embodiments are described exemplarily by pictures in the corresponding drawings, and these exemplary descriptions do not constitute limitations to the embodiments.

DETAILED DESCRIPTION

A main objective of embodiments of this application is to provide a method and circuit for multiplexing a USB interface, an electronic device and a storage medium, in order to multiplex the USB interface in a multiprocessor terminal, so that data can be transmitted to different types of ports of a plurality of processors by using only one standard USB interface without a plurality of interfaces for peripheral access such as test points and debugging connectors, thereby realizing data communication and debugging, which is very conducive to simplified design and function extension of product interfaces, and subsequent debugging and fault handling of the whole device.

To make the objective, technical solutions, and advantages of this application clearer, the following further describes embodiments of this application in detail with reference to the accompanying drawings. However, those of ordinary skill in the art can understand that in the embodiments of this application, many technical details are put forward in order to make readers better understand this application. However, even without these technical details and various variations and modifications based on the following embodiments, the technical solutions claimed in this application can be achieved. The following division of the embodiments is for the convenience of description and shall not constitute any limitation to the specific implementation of this application, and the embodiments may be combined with each other and referenced to each other without contradiction.

Figure 1:
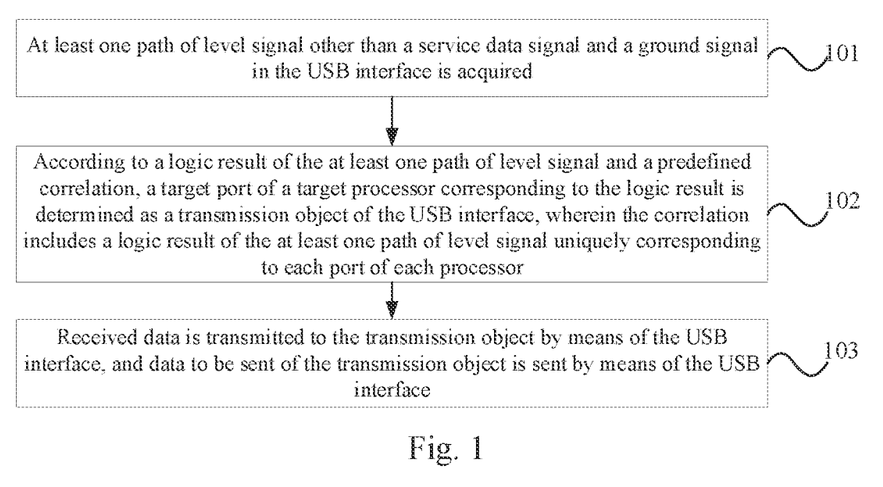
FIG. 1 is a flowchart of a method for multiplexing a USB interface according to a first embodiment of this application.

A first embodiment of this application relates to a method for multiplexing a USB interface, applied to an electronic device, so that by multiplexing one USB interface, data can be transmitted to a plurality of ports of one processor or ports of a plurality of processors included in the electronic device to which the USB interface belongs. The electronic device here may be a wireless terminal device such as Tracker and CPE. As shown in FIG. 1, the method specifically includes:

At operation 101, at least one path of level signal other than a service data signal and a ground signal in the USB interface is acquired.

Specifically, in a universal serial bus (USB) interface, a USB_DP pin and a USB_DM pin are configured to transmit service data, and signals provided by the USB_DP pin and the USB_DM pin are called service data signals. A GND pin is configured to be grounded, and signals provided by the GND pin are ground signals. Since the service data signal and the ground signal in the USB interface cannot be adjusted at will in the communication process, only signals other than the service data signal and the ground signal in the USB interface can be selected for subsequent selection of processor ports. That is, a level signal provided by at least one different pin other than the USB_DP pin, the USB_DM pin and the GND pin in the USB interface is acquired.

More specifically, when the USB interface is a Micron USB interface, signals provided by the USB interface include the service data signal, the ground signal, a USB_VBUS signal and a USB_ID signal. In this case, the acquired level signal is the USB_VBUS signal and/or the USB_ID signal. When the USB interface is a Type-C USB interface, signals provided by the USB interface include a signal for service data transmission, the ground signal, a USB_VBUS signal, an SBU1 signal, an SBU2 signal, a CC1 signal, a CC2 signal and a USB_ID signal etc., the acquired signal is any one or a combination of the USB_VBIS signal, the SBU1 signal, the SBU2 signal, the CC1 signal and the CC2 signal, for example, to acquire the CC1 signal, or to acquire the CC1 signal and the SBU2 signal, or to acquire the CC1 signal, the USB_VBIS signal and the CC2 signal. Of course, the above is only specific exemplary illustration, and in the actual use process, at least one path of signal other than the signal for service data transmission and the ground signal in other types of USB interfaces, may be also included, which will not be elaborated one by one herein.

In an example, in order to meet actual demands of users, before executing the operation 101, the method further includes: setting high and low level states of the at least one path of level signal according to demands. Moreover, in order to set the level signal, a control switch may be designed to control the high and low level states of the level signal in the USB port, for example, selection and setting with the switch on a USB cable or a USB debugger. Of course, the above is only specific exemplary illustration, in the actual use process, setting of the level signal may also be realized by other manners, which will not be elaborated one by one herein.

It should also be illustrated that, the above description of the signals are named by pins, such as the CC2 signal is the signal provided by a CC2 pin of the USB interface.

At operation 102, according to a logic result of the at least one path of level signal and a predefined correlation, a target port of a target processor corresponding to the logic result is determined as a transmission object of the USB interface, wherein the correlation includes a logic result of the at least one path of level signal uniquely corresponding to each port of each processor.

Specifically, the processor ports include the USB interface, a UART interface, an I2C interface, an SPI interface, etc. Of course, the above is only specific exemplary illustration, In the actual use process, the processor interfaces may also include other interfaces, by which service data can be transmitted by the USB interface after being converted, which will not be described one by one in detail herein.

In a specific example, the correlation defines a one-to-one correlation between ports of processors and various possible logics of the at least one path of level signal, for example, the logic of the CC1 signal corresponding to the USB1 port of the processor 1 is represented as 0, and the logic of the CC1 signal corresponding to the USB2 port of the processor 1 is represented as 1. Assuming that the level signal logic of the CC1 signal obtained after operation 101 is executed is 0, then it is uniquely determined that the transmission object is the USB1 port of the processor 1 according to the correlation. When a plurality of level signals are acquired, the logic result refers to a logic combination result of the plurality of level signals, such as a logic combination 00 of two paths of level signals corresponding to the USB port of the processor 1, a logic combination 01 of two paths of level signals corresponding to the Universal Asynchronous Receiver/Transmitter (UART) interface of the processor 1 and a logic combination 11 of two paths of level signals corresponding to the USB port of the processor 2. Assuming that the two paths of level signals are obtained after operation 101 is executed and the logic combination result is 00, then according to the correlation, it is uniquely determined that the transmission object is the USB port of the processor 1.

It should be illustrated that, in the correlation, the total number of ports of the processor is not greater than the total number of various possible logic results of the at least one path of level signal.

At operation 103, received data is transmitted to the transmission object by means of the USB interface, and data to be sent of the transmission object is sent by means of the USB interface.

Particularly, after operation 102 is executed to determine the transmission object, a channel for data transmission is established between the USB interface and the transmission object, a peripheral sends data in the peripheral to the target processor sequentially through the USB interface, the channel for data transmission and the transmission object, then, the target processor correspondingly processes the received data, and sends a processing result as data to be sent to the peripheral sequentially through the transmission object, the channel for data transmission and the USB interface.

Compared with the prior art, in the embodiments provided by this application, after the at least one path of level signal other than the service data signal and the ground signal in the USB interface is acquired, according to the logic combination result of the at least one path of level signal, the target port of one target processor can be selected from various ports of all the processors as the transmission object of the USB interface according to the logic result of the at least one path of level signal uniquely corresponding to each port of each processor and the logic result of at least one path of level signal. Thereby, the received data can be transmitted to the transmission object by means of the USB interface, and the data to be sent of the transmission object can be sent by means of the USB interface. Since all the processor ports in the terminal may be used as the transmission object, the one-to-one correlation between the USB interface for peripheral access on the terminal and the processor port is destroyed, so that one USB interface can communicate with various ports of all the processors in the terminal. Multiplexing of the USB interface in the multiprocessor terminal is realized, so that data can be transmitted to the plurality of processor ports by using only one standard USB interface without test points and debugging connectors to realize data communication and debugging, which is very conducive to simplified design and function extension of product interfaces and subsequent debugging and fault handling of the whole device.

Figure 2:
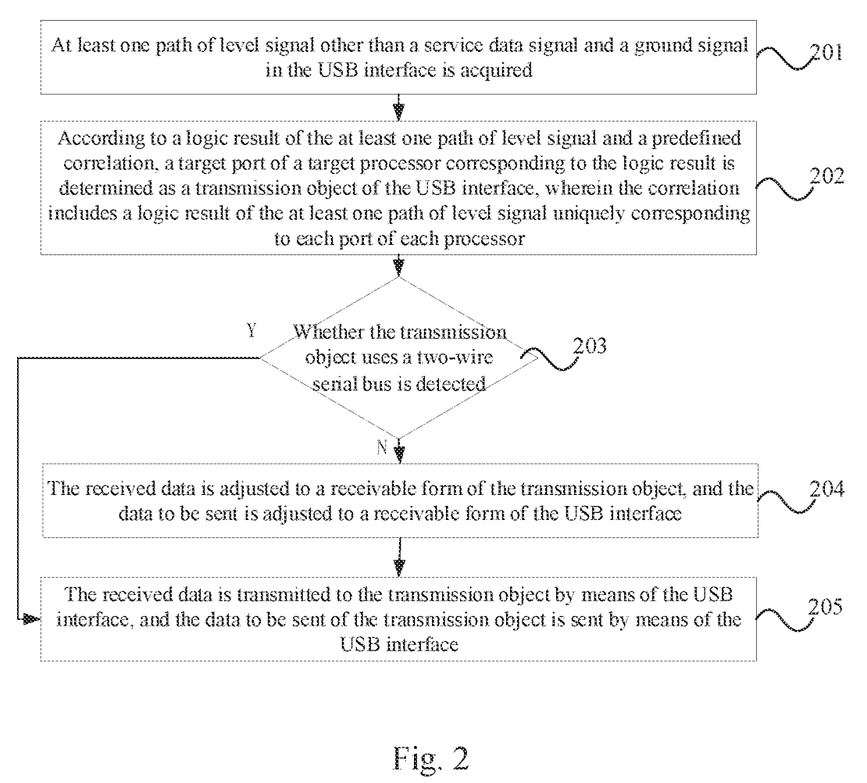
FIG. 2 is a flowchart of a method for multiplexing a USB interface according to a second embodiment of this application.

A second embodiment of this application relates to a method for multiplexing a USB interface. In this embodiment, before transmitting the received data to the transmission object by means of the USB interface, and sending the data to be sent of the transmission object by means of the USB interface, whether the transmission object uses a two-wire serial bus is detected. As shown in FIG. 2, the method specifically includes:

At operation 201, at least one path of level signal other than a service data signal and a ground signal in the USB interface is acquired.

Specifically, operation 201 in this embodiment is substantially the same as operation 101 in the first embodiment, and details will not be repeated herein.

At operation 202, according to a logic result of the at least one path of level signal and a predefined correlation, a target port of a target processor corresponding to the logic result is determined as a transmission object of the USB interface, wherein the correlation includes a logic result of the at least one path of level signal uniquely corresponding to each port of each processor.

Specifically, operation 202 in this embodiment is substantially the same as operation 102 in the first embodiment, and details will not be repeated herein.

At operation 203, whether the transmission object uses a two-wire serial bus is detected, if so, operation 204 is executed, and if not, operation 205 is executed.

Specifically, the type of the interface indicates the form of the bus used by the interface, for example, an SPI interface uses a four-wire serial bus, and a two-wire UART interface uses a two-wire serial bus. Therefore, detecting whether the transmission object adopts a two-wire serial bus can be realized by detecting the type of the interface of the transmission object.

At operation 204, the received data is adjusted to a receivable form of the transmission object, and the data to be sent is adjusted to a receivable form of the USB interface.

Particularly, since the two-wire serial bus transmits data in 2 channels at one time and the four-wire serial bus transmits data in 4 channels at one time, data cannot be transmitted directly from one interface to the other interface when the data is transmitted between two interfaces using different types of serial buses. The data cannot be normally sent and received between two interfaces using different types of serial buses unless being processed. By adjusting the received data to the receivable form of the transmission object, and adjusting the data to be sent to the receivable form of the USB interface, when data is transmitted between interfaces using different types of serial buses, data of a sender can be converted into data that can be received by a receiver, so that the data can be transmitted normally.

In one example, in order to convert data stored in an interface using certain type of serial bus into receivable data of an interface using another type of serial bus, a bridge chip may be used to process the stored data, for example, a USB-to-SPI bridge chip is used to convert data sent by a USB interface into a form that can be received by an SPI interface.

At operation 205, the received data is transmitted to the transmission object by means of the USB interface, and the data to be sent of the transmission object is sent by means of the USB interface.

Specifically, if the transmission object and the USB interface use different types of serial buses, the received and adjusted data is transmitted to the transmission object by means of the USB interface, and the adjusted data to be sent of the transmission object is sent by means of the USB interface. If the transmission object and the USB interface uses the same type of serial bus, the received data is directly transmitted to the transmission object by means of the USB interface, and the data to be sent of the transmission object is directly sent by means of the USB interface.

Compared with the prior art, in this embodiment of the disclosure, on the basis of realizing the beneficial effects of the first embodiment, whether the USB interface and the transmission object can communicate directly can be detected, and in the case of being incapable of direct communication, the received data is adjusted to the receivable form of the transmission object, and the data to be sent is adjusted to the receivable form of the USB interface. When data is transmitted between interfaces using different types of serial buses, the data of the sender is converted into the data that can be received by the receiver, so that the data can be transmitted normally, which avoids data transmission error caused by mismatch between the USB interface and the transmission object, and improves the accuracy of data transmission.

Figure 3:
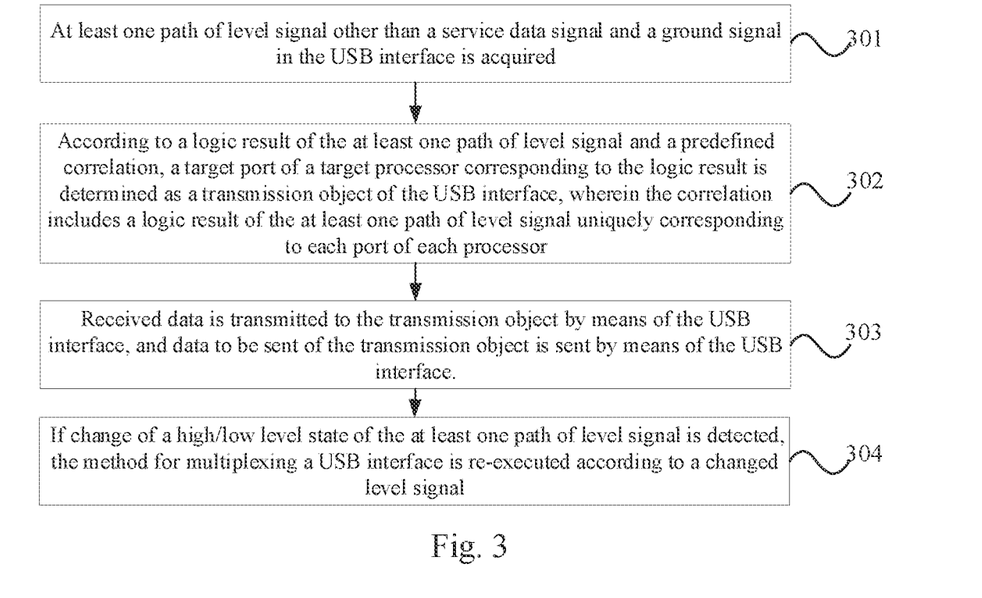
FIG. 3 is a flowchart of a method for multiplexing a USB interface according to a third embodiment of this application.

A third embodiment of this application relates to a method for multiplexing a USB interface. In this embodiment, after transmitting the received data to the transmission object by means of the USB interface, and sending the data to be sent of the transmission object by means of the USB interface, the transmission object can be switched. As shown in FIG. 3, the method specifically includes:

At operation 301, at least one path of level signal other than a service data signal and a ground signal in the USB interface is acquired.

Specifically, operation 301 in this embodiment is substantially the same as operation 101 in the first embodiment, and details will not be repeated herein.

At operation 302, according to a logic result of the at least one path of level signal and a predefined correlation, a target port of a target processor corresponding to the logic result is determined as a transmission object of the USB interface, wherein the correlation includes a logic result of the at least one path of level signal uniquely corresponding to each port of each processor.

Specifically, operation 302 in this embodiment is substantially the same as operation 102 in the first embodiment, and details will not be repeated herein.

At operation 303, received data is transmitted to the transmission object by means of the USB interface, and data to be sent of the transmission object is sent by means of the USB interface.

Specifically, operation 303 in this embodiment is substantially the same as operation 103 in the first embodiment, and details will not be repeated herein.

At operation 304, if change of high and low level states of the at least one path of level signal is detected, the method for multiplexing a USB interface is re-executed according to a changed level signal.

Specifically, since the high and low level states of the level signal uniquely determines the logic result of the at least one path of level signal, and the transmission object is uniquely determined according to the correlation, once the high and low level states of the level signal changes, it is indicated that the uniquely determined transmission object has changed. The high and low level states of the at least one path of level signal acquired in operation 301 may be detected in real time or periodically. If any one of the at least one path of level signal changes, the method for multiplexing the USB interface is re-executed to re-determine the transmission object, thereby realizing switching of the transmission object.

It should be illustrated that when a user needs to switch the transmission object while keeping the conditions such as the electronic device and peripheral unchanged, by only resetting the high and low level states of the level signal acquired in operation 301 according to the needs and the correlation, switching among the debugging and communication ports of the processor in the terminal, or switching among different processors can be controlled by means of the method for multiplexing a USB interface provided by this embodiment without replacement of the USB interface, thereby realizing the smooth switching of USB ports among processors and processor ports, reducing the waste of labor and time, and improving the efficiency of data transmission and debugging.

Compared with the prior art, in this embodiment of the disclosure, on the basis of realizing the beneficial effects of the first embodiment, when any one of the at least one path of level signal changes, the method for multiplexing a USB interface can be re-executed to re-determine the transmission object, thereby realizing switching of the transmission object. Further, the user can control switching among the debugging and communication ports of the processor in the terminal, or switching among different processors, by resetting the high and low level states of the level signal without replacement of the USB interface, thereby realizing smooth switching of USB ports among processors and processor ports, reducing the waste of labor and time, and improving the efficiency of data transmission and debugging.

In addition, it should be understood that the division of operations in the above methods is for descriptive purposes only, and in the implementation, the operations may be combined into one operation or a certain operation may be split into a plurality of operations, as long as the same logical relationship is included, it is within the scope of protection of this application. Any addition of insignificant modifications or introduction of insignificant designs to the algorithm or flow without changing the core design of the algorithm or process shall fall within the scope of protection of this application.

Figure 4:
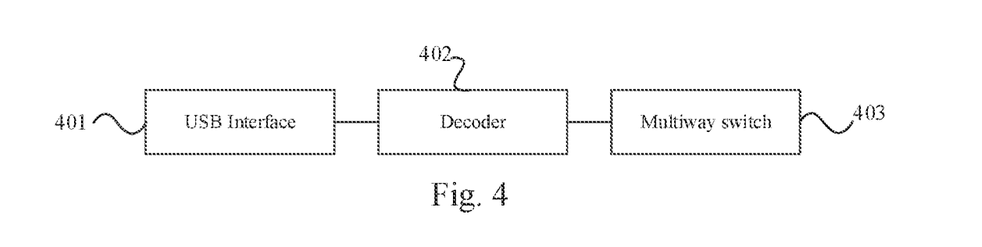
FIG. 4 is a structural schematic diagram of a circuit for multiplexing a USB interface according to a fourth embodiment of this application.

A fourth embodiment of the disclosure relates to a circuit for multiplexing a USB interface, as shown in FIG. 4, including the following:

A USB interface 401 is configured to transmit signals.

A decoder 402 is configured to acquire at least one path of level signal other than a service data signal and a ground signal in the USB interface, and determine, according to a logic result of the at least one path of level signal and a predefined correlation, a target port of a target processor corresponding to the logic result as a transmission object of the USB interface; wherein, the correlation includes a logic result of the at least one path of level signal uniquely corresponding to each port of each processor.

Figure 5:
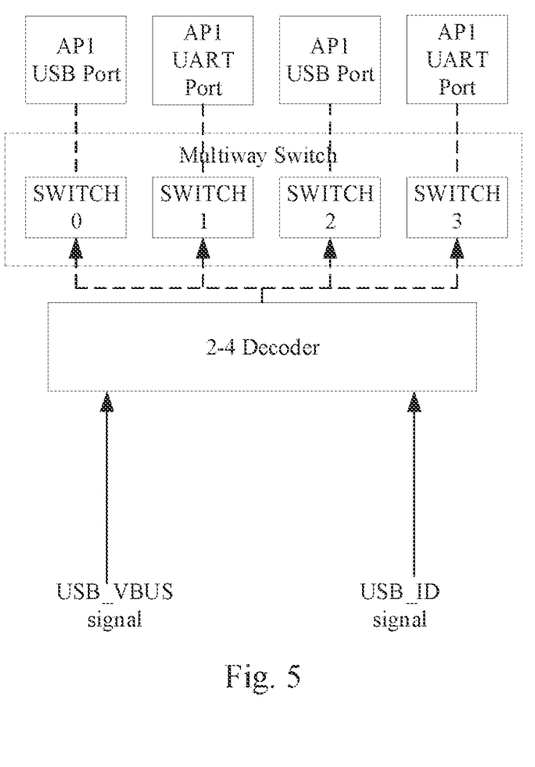
FIG. 5 is an application schematic diagram I of a circuit for multiplexing a USB interface according to the fourth embodiment of this application shown in FIG. 4.

Specifically, when the USB interface 401 is a Micron USB interface, pins of the USB interface include a USB_DP pin, a USB_DM pin, a USB_ID pin, a USB_VBUS pin and a USB_ID pin. It is assumed that the electronic device to which the USB interface 401 belongs includes two processors, each processor including two ports; and as shown in FIG. 5, the processors are respectively AP1 and AP2, ports of AP1 including an AP1 USB port and an AP1 UART port, and ports of AP2 including an AP2 USB port and an AP2 UART port. Then, 2-4 decoder may be selected as the decoder 402. In this case, the USB_DP pin, the USB_DM pin and the USB_ID pin in the USB interface are used normally, and level signals provided by the USB_VBUS pin and the USB_ID pin are used as the input (equivalent to a logic result of the at least one path of level signal) of the decoder 402. Then the decoder 402 outputs a control signal to control a gate state of the multiway switch 403 after decoding, wherein, as shown in FIG. 5, the circuit where each switch of the multiway switch 403 is located is connected to different processor ports. Then, according to the connection relation shown in FIG. 5, the correlation represented by the logic combination result of the at least one path of level signal uniquely corresponding to each port of each processor is shown in the table below:

| Decoder input (USB_VBUS signal + USB_ID signal) | Decoder output (control signal) | Multiway switch | Port of processor |
|---|---|---|---|
| 00 | 0 | SWITCH0 | AP1 USB port |
| 01 | 1 | SWITCH1 | AP1 UART port |
| 10 | 2 | SWITCH2 | AP2 USB port |
| 11 | 3 | SWITCH3 | AP2 UART port |

After every time the decoder 402 acquires the USB_VBUS signal and the USB_ID signal provided by the USB_VBUS pin and the USB_ID pin as input, it can uniquely determine one port from the AP1 USB port, the AP1 UART port, the AP2 USB port and the AP2 UART port as the transmission object according to the table above. For example, if the level signal input by the USB_VBUS pin and the USB_ID pin to the decoder 402 is 10, then it is determined according to the table above that the processor port is the AP2 USB port, and the control signal 2 is generated to control the multiway switch to gate SWITCH2 for data transmission.

Figure 6:
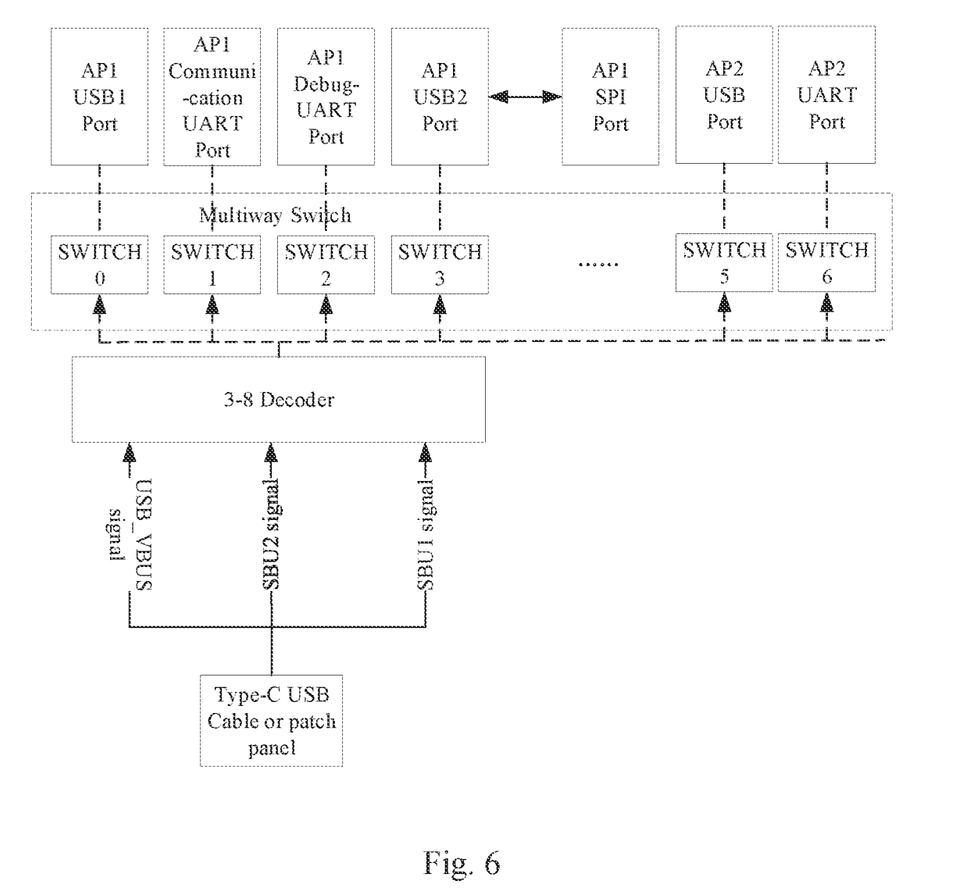
FIG. 6 is an application schematic diagram II of a circuit for multiplexing a USB interface according to the fourth embodiment of this application shown in FIG. 4.

Similarly, when the USB interface 401 is a Type-C USB interface, pins of the USB interface include an SBU1 pin, an SBU2 pin, a CC1 pin, a CC2 pin, a USB_DP pin, a USB_DM pin, a USB_ID pin, a USB_VBUS pin and a USB_ID pin. It is assumed that the electronic device to which the USB interface 401 belongs includes two processors, and the total number of processor ports is 7; and as shown in FIG. 6, the processors are respectively AP1 and AP2, ports of AP1 including an AP1 USB1 port, an AP1 communication UART port, an AP1 Debug_UART port, an AP1 USB2 port and an AP1 SPI port, and ports of AP2 including an AP2 USB port, an AP2 UART port, etc. Then, a 3-8 decoder may be selected as the decoder 402. In this case, the USB_DP pin, the USB_DM pin and the USB_ID pin in the USB interface are used normally, 3 pins are selected from the SBU1 pin, the SBU2 pin, the CC1 pin, the CC2 pin and the USB_VBUS pin to provide input signals for the decoder 402, and the unselected pins are used normally. Here, description is made in an example where the SBU1 pin, the SBU2 pin and the USB_VBUS pin are selected to provide the input signals for the decoder 402. Level signals provided by the SBU1 pin, the SBU2 pin and the USB_VBUS pin are used as the input (equivalent to a logic result of the at least one path of level signal) of the decoder 402. Then the decoder 402 outputs a control signal to control a gate state of the multiway switch 403 after decoding, wherein, as shown in FIG. 6, the circuit where each switch of the multiway switch 403 is located is connected to different processor ports. Then, according to the connection relation shown in FIG. 6, the correlation represented by the logic combination result of the at least one path of level signal uniquely corresponding to each port of each processor is shown in the table below:

| Decoder input (USB_VBUS signal + SBU1 signal + SBU2 signal) | Decoder output (control signal) | Multiway switch | Port of processor |
|---|---|---|---|
| 000 | 0 | SWITCH0 | AP1 USB1 port |
| 001 | 1 | SWITCH1 | AP1 communication UART port |
| 010 | 2 | SWITCH2 | AP1 Debug_UART port |
| 011 | 3 | SWITCH3 | AP1 USB2 port |
| 100 | 4 | SWITCH4 | AP1 SPI port |
| 101 | 5 | SWITCH5 | AP2 USB port |
| 110 | 6 | SWITCH6 | AP2 UART port |

In this case, as shown in FIG. 6, a Type-C USB cable or a patch panel is further provided for connection with a switch or a button, so that the high and low level states of the SBU1 pin, the SBU2 pin and the USB_VBUS pin in the USB interface 401 can be set manually. Every time the high and low level states of the SBU1 pin, the SBU2 pin and the USB_VBUS pin are set through the Type-C USB cable or the patch panel, the decoder 402 acquires a corresponding input, and then uniquely determines one port from the 7 processor ports shown in FIG. 6 as the transmission object according to the table above. For example, a coder is controlled through the Type-C USB cable or the patch panel to switch all logic levels of the VBUS pin, the SUB1 pin and the SBU2 pin to 0, and the decoder 402 outputs the control signal 0 to control the multiway switch to gate an SWITCH0 corresponding to the AP1 USB1 port. At this time, an external USB_VBUS power supply is needed to power the AP1 VBUS port, i.e., to provide enum, thereby realizing data communication between the USB interface 401 and the AP1 USB1 port; Or, the coder is controlled through the Type-C USB cable or the patch panel to switch logic levels of the VBUS pin, the SUB1 pin and the SBU2 pin to "110", and the decoder 402 outputs the control signal 6, to control the multiway switch to gate an SWITCH6 corresponding to the AP2 UART port, thereby realizing data communication between the USB interface 401 and the AP2 UART port. At this time, power supply of the AP2 USB_VBUS needs to be cut off, etc.

Of course, the above is only specific exemplary illustration. In the actual use process, the decoder 402 may also be other types of decoders and use signals provided by other pins connected to the USB interface 401 as input, which will not be described in detail herein.

The multiway switch 403 is configured to gate a transmission channel between the USB interface and the transmission object, such that received data is transmitted to the transmission object by means of the USB interface and data to be sent of the transmission object is sent by means of the USB interface.

Specifically, the multiway switch 403 further includes a data transmission channel established between the USB interface and the transmission object. When communication is performed based on the multiplexing function of the USB interface 401, data enters the USB interface 401 from the peripheral, and after the decoder 402 determines the gate state of the multiway switch, data in the USB interface 401 reaches the corresponding processor port through the multiway switch 403, and finally enters the processor and is processed. After data processing is completed, a processing result is sent to the peripheral sequentially through the processor port, the multiway switch 403 and the USB interface 401.

It is not difficult to find that this embodiment is an embodiment of the circuit for multiplexing an USB interface corresponding to the first embodiment, and this embodiment can be implemented in cooperation with the first embodiment. The related technical details mentioned in the first embodiment are still valid in this embodiment, and in order to reduce repetition, these details are not repeated here. Accordingly, the related technical details mentioned in this embodiment may also be applied to the first embodiment.

In addition, in order to highlight the innovative part of the disclosure, units that are not closely related to solving the technical problem provided by the disclosure are not introduced in this embodiment, but this does not mean that there are no other units in this embodiment.

Figure 7:
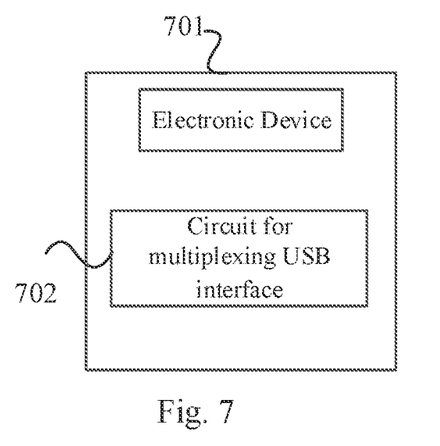
FIG. 7 is a structural schematic diagram of an electronic device according to a fifth embodiment of this application.

A fifth embodiment of this application relates to an electronic device, as shown in FIG. 7, the electronic device 701 includes a circuit for multiplexing a USB interface 702. In this embodiment, the circuit for multiplexing a USB interface 702 is substantially the same as in the fourth embodiment, and details will not be repeated here.

A sixth embodiment of the disclosure relates to a computer-readable storage medium, storing a computer program. The computer program, when executed by a processor, implements the above method embodiment.

That is, it can be understood by those skilled in the art that all or part of the operations in the method of the above embodiments can be completed by instructing related hardware through a program, the program is stored in a storage medium, and includes a plurality of instructions to make a device (which may be a single-chip microcomputer, chip, etc.) or a processor execute all or part of the operations of the method described in the embodiments of this application. The above storage medium includes: a USB flash drive, a mobile hard disk, a read-only memory (ROM), a random access memory (RAM), a magnetic disk, an optical disk, or any medium that can store program codes.

It can be understood by those of ordinary skill in the art that the above embodiments are specific embodiments for realizing this application, but in practical applications, various changes can be made in form and details without departing from the spirit and scope of this application.

What is claimed is:

1. A method for multiplexing a USB interface, an electronic device to which the USB interface belongs comprising a plurality of processor ports; and the method comprising:
   acquiring at least one path of level signal other than a service data signal and a ground signal in the USB interface;
   determining, according to a logic result of the at least one path of level signal and a predefined correlation, a target port of a target processor corresponding to the logic result as a transmission object of the USB interface, wherein, the predefined correlation comprises a logic result of the at least one path of level signal uniquely corresponding to each port of each processor; and
   transmitting received data to the transmission object via the USB interface, and sending data to be sent from the transmission object via the USB interface.

2. The method for multiplexing a USB interface according to claim 1, wherein, the USB interface is a Micro-USB interface, and the level signal is a USB_VBUS signal or a USB_ID signal.

3. The method for multiplexing a USB interface according to claim 1, wherein, the USB interface is a Type-C USB interface, and the level signal is a USB_VBUS signal, an SBU1 signal, an SBU2 signal, a CC1 signal or a CC2 signal.

4. The method for multiplexing a USB interface according to claim 1, wherein, before the transmitting received data to the transmission object via the USB interface, and sending data to be sent from the transmission object via the USB interface, further comprising:
   detecting whether the transmission object uses a two-wire serial bus; and
   upon the condition that the transmission object does not use the two-wire serial bus adjusting the received data to a receivable form of the transmission object, and adjusting the data to be sent to a receivable form of the USB interface.

5. The method for multiplexing a USB interface according to claim 1, wherein, before the acquiring at least one path of level signal other than a service data signal and a ground signal in the USB interface, further comprising:
   setting high and low level states of the at least one path of level signal.

6. The method for multiplexing a USB interface according to claim 1, wherein, after the transmitting received data to the transmission object via the USB interface, and sending data to be sent from the transmission object via the USB interface, further comprising:
   re-executing, upon the condition that change of high and low level states of the at least one level signal is detected, the method for multiplexing a USB interface according to the changed level signal.

7. The method for multiplexing a USB interface according to claim 1, wherein, the target port is a UART interface, an I2C interface or an SPI interface.

8. A non-transitory computer-readable storage medium storing a computer program, and the computer program, when executed by a processor, implementing the method for multiplexing a USB interface according to claim 1.

9. The method for multiplexing a USB interface according to claim 2, wherein, the USB interface is a Type-C USB interface, and the level signal is a USB_VBUS signal, an SBU1 signal, an SBU2 signal, a CC1 signal or a CC2 signal.

10. The method for multiplexing a USB interface according to of claim 2, wherein, before the transmitting received data to the transmission object via the USB interface, and sending data to be sent from the transmission object via the USB interface, further comprising:
    detecting whether the transmission object uses a two-wire serial bus; and
    upon the condition that the transmission object does not use the two-wire serial bus adjusting the received data to a receivable form of the transmission object, and adjusting the data to be sent to a receivable form of the USB interface.

11. The method for multiplexing a USB interface according to of claim 3, wherein, before the transmitting received data to the transmission object via the USB interface, and sending data to be sent from the transmission object via the USB interface, further comprising:
    detecting whether the transmission object uses a two-wire serial bus; and
    upon the condition that the transmission object does not use the two-wire serial bus adjusting the received data to a receivable form of the transmission object, and adjusting the data to be sent to a receivable form of the USB interface.

12. The method for multiplexing a USB interface according to claim 2, wherein, before the acquiring at least one path of level signal other than a service data signal and a ground signal in the USB interface, further comprising:
    setting high and low level states of the at least one path of level signal.

13. The method for multiplexing a USB interface according to claim 3, wherein, before the acquiring at least one path of level signal other than a service data signal and a ground signal in the USB interface, further comprising:
    setting high and low level states of the at least one path of level signal.

14. The method for multiplexing a USB interface according to claim 9, wherein, before the acquiring at least one path of level signal other than a service data signal and a ground signal in the USB interface, further comprising:
    setting high and low level states of the at least one path of level signal.

15. The method for multiplexing a USB interface according to claim 2, wherein, after the transmitting received data to the transmission object via the USB interface, and sending data to be sent from the transmission object via the USB interface, further comprising:
    re-executing, upon the condition that change of high and low level states of the at least one level signal is detected, the method for multiplexing a USB interface according to the changed level signal.

16. The method for multiplexing a USB interface according to claim 3, wherein, after the transmitting received data to the transmission object via the USB interface, and sending data to be sent from the transmission object via the USB interface, further comprising:

re-executing, upon the condition that change of high and low level states of the at least one level signal is detected, the method for multiplexing a USB interface according to the changed level signal.

17. The method for multiplexing a USB interface according to claim 9, wherein, after the transmitting received data to the transmission object via the USB interface, and sending data to be sent from the transmission object via the USB interface, further comprising:

re-executing, upon the condition that change of high and low level states of the at least one level signal is detected, the method for multiplexing a USB interface according to the changed level signal.

18. A circuit for multiplexing a USB interface, comprising:

a USB interface, configured to transmit signals;

a decoder, configured to acquire at least one path of level signal other than a service data signal and a ground signal in the USB interface, and determine, according to a logic result of the at least one path of level signal and a predefined correlation, a target port of a target processor corresponding to the logic result as a transmission object of the USB interface; wherein, the correlation comprises a logic result of the at least one path of level signal uniquely corresponding to each port of each processor; and a multiway switch, configured to gate a transmission channel between the USB interface and the transmission object, such that received data is transmitted to the transmission object via the USB interface, and data to be sent from the transmission object is sent via the USB interface.

19. An electronic device, comprising the circuit for multiplexing a USB interface according to claim 18.

20. An electronic apparatus, comprising at least one processor; and a memory communicably connected with the at least one processor for storing instructions executable by the at least one processor, wherein execution of the instructions by the at least one processor causes the at least one processor to execute the method for multiplexing a USB interface according to claim 1.

\* \* \* \* \*